United States Patent
van Stiphout

(10) Patent No.: US 8,672,495 B2
(45) Date of Patent: Mar. 18, 2014

(54) MIRROR ADJUSTMENT UNIT WITH ELECTRIC ACCESSORY

(75) Inventor: Paulus Gerardus Maria van Stiphout, Woerden (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 0 days.

(21) Appl. No.: 13/126,783

(22) PCT Filed: Oct. 30, 2009

(86) PCT No.: PCT/NL2009/050656
§ 371 (c)(1),
(2), (4) Date: Sep. 12, 2011

(87) PCT Pub. No.: WO2010/050813
PCT Pub. Date: May 6, 2010

(65) Prior Publication Data
US 2011/0317298 A1  Dec. 29, 2011

(30) Foreign Application Priority Data
Oct. 30, 2008 (NL) ..................... 2002154

(51) Int. Cl.
*G02B 7/182* (2006.01)
(52) U.S. Cl.
USPC ...................................... 359/872
(58) Field of Classification Search
USPC ................................. 359/871–878
See application file for complete search history.

(56) References Cited

U.S. PATENT DOCUMENTS

| 4,646,210 A * | 2/1987 | Skogler et al. ............... 362/142 |
| 4,877,319 A * | 10/1989 | Mittelhauser ............... 359/841 |
| 4,883,349 A * | 11/1989 | Mittelhauser ............... 359/872 |
| 5,308,247 A | 5/1994 | Dyrdek |
| 5,649,756 A | 7/1997 | Adams et al. |
| 6,244,714 B1 * | 6/2001 | Mertens ....................... 359/512 |
| 6,565,221 B2 * | 5/2003 | Guttenberger et al. ....... 359/877 |
| 2004/0145904 A1 | 7/2004 | DeLine et al. |
| 2008/0130149 A1 | 6/2008 | Blank et al. |
| 2011/0317296 A1 * | 12/2011 | Schmierer et al. ............ 359/871 |

FOREIGN PATENT DOCUMENTS

| GB | 2308109 A1 | 6/1997 |
| JP | H06-027333 U | 6/1994 |
| JP | H08-185932 A | 7/1996 |
| JP | H10-059137 A | 3/1998 |
| WO | 2006039952 A1 | 4/2006 |

OTHER PUBLICATIONS

European Patent Office, International Search Report and Written Opinion issued in corresponding PCT Application PCT/NL2009/050656. Date of Mailing: Jan. 19, 2010.

The International Bureau of WIPO, International Preliminary Report on Patentability, issued in corresponding PCT Application PCT/NL2009/050656. Date of Issue: May 3, 2011.

* cited by examiner

*Primary Examiner* — Euncha Cherry
(74) *Attorney, Agent, or Firm* — Dykema Gossett PLLC

(57) ABSTRACT

A mirror adjustment unit for a rearview mirror of a motor vehicle includes a mirror adjustment mechanism and a mirror support. The mirror support is couplable to the mirror adjustment mechanism, and includes at least one electric accessory. The mirror adjustment mechanism includes a plurality of prong-shaped electrically conductive elements configured to electrically connect the electric accessory of the mirror support with at least one of the conductive elements of the mirror adjustment mechanism by plug connection.

20 Claims, 1 Drawing Sheet

MIRROR ADJUSTMENT UNIT WITH ELECTRIC ACCESSORY

CROSS-REFERENCE TO RELATED APPLICATION

This application is a national stage filing based upon International PCT Application No. PCT/NL2009/050656, with an international filing date of Oct. 30, 2009, which claims the benefit of priority to Netherlands Application No. 2002154, filed Oct. 30, 2008, each of which applications are fully incorporated herein by reference as though fully set forth herein.

TECHNICAL FIELD

The invention relates to a mirror adjustment unit for a rearview mirror of a motor vehicle, comprising a mirror adjustment mechanism and a mirror support couplable thereto provided with at least one electric accessory.

BACKGROUND

Mirror adjustment units are generally known and are widely used. For instance, the electric accessory can comprise a blinker or a mirror heating. Also, the electric accessory may provide for projection of information on the mirror, or comprise a mirror wiper.

Disadvantageous about the known mirror adjustment unit is that mounting the electric accessory to the mirror adjustment mechanism may be complex and/or susceptible of error. Also, such a mirror adjustment unit and/or the mounting thereof can be expensive.

SUMMARY

The invention contemplates a mirror adjustment unit in which at least one of the above-mentioned disadvantages may be prevented.

To this end, the invention provides a mirror adjustment unit for a rearview mirror of a motor vehicle, comprising a mirror adjustment mechanism and a mirror support couplable thereto provided with at least one electric accessory, wherein the mirror adjustment mechanism is provided with a number of prong-shaped electrically conductive elements for electrically connecting the electric accessory of the mirror support with the conductive elements by means of a plug connection.

By providing for a plug connection, the electric accessory can be coupled relatively simply and reliably with the conductive elements of the mirror adjustment mechanism. By making use of a plug connection, the coupling with the electric accessory can be effected with few parts, so that assembly of the mirror adjustment unit can be carried out relatively inexpensively. Also, by making use of a plug connection the chance of errors during assembly can be reduced.

By providing prong-shaped elements, on the one hand these elements can be flexible enough to move along with the adjusting movements of the mirror adjustment mechanism, and on the other hand these elements can be stiff enough to effect a reliable electrical connection. The prong-shaped elements may for instance be relatively thin rod-shaped elements, which, for instance, are stiff enough to stand upright, such as copper wire or steel wire.

The plug connection can for instance comprise a plug in which an end of the conductive elements can be received. Also, an end of each conductive element may be provided each with a separate plug for receiving corresponding projecting elements of the electric accessory. Also, the end of a conductive element may be designed as a plug element suitable for receiving a projecting element of the mirror support for the electric accessory. Possibly, the mirror support can comprise a plug element in which the ends of the prong-shaped conductive elements can be received.

A mirror support may be provided with more than one electric accessory. Thus, the mirror support can for instance comprise a blinker or another light, but also, for instance, a mirror heating element and/or a mirror wiper and/or an information display unit. The information display unit can for instance display information from rearview cameras or from an onboard computer, such as route information, on the rearview mirror. Possibly, each electric accessory may be separately connected by means of a plug connection with prong-shaped electrically conductive elements. Also, there may be provided just one plug connection for the electrical connection between the mirror adjustment mechanism and the mirror support, after which possibly different electric accessories can be electrically connected from the plug connection.

By making the prong-shaped electrically conductive elements of at least partly uninsulated design, the electrical connection with the accessory can be manufactured relatively inexpensively. For instance, at the end of a prong-shaped conductive element a portion may be uninsulated, which uninsulated portion can function as a projecting element to be received in a plug element. Possibly, the whole prong-shaped electrically conductive element may be of uninsulated design.

By making the prong-shaped electrically conductive elements electrically separate, the elements can be simply used in an existing design for a mirror adjustment mechanism. As a result, adaptations to an existing design for a mirror adjustment mechanism can be minimal, allowing the costs to be limited. Possibly, the prong-shaped electrically conductive elements may be arranged completely separately from each other in the mirror adjustment mechanism. Also, the prong-shaped electrically conductive elements may for instance be bundled or be designed as a strip. In such a bundle or strip, the electrically conductive elements may be electrically separate from each other.

As the prong-shaped electrically conductive elements comprise a predetermined bending point, they can relatively easily move along with the adjusting movements of the mirror adjustment mechanism. The predetermined bending point means that at a predetermined position on the prong-shaped element, the prong-shaped element changes direction. At the predetermined position there is, as it were, a kink in the prong-shaped element. Because of the predetermined bending point, the conductive elements can move along with the adjusting movements, so that the elements can reliably follow the adjusting movements of the mirror adjustment mechanism. Also, the predetermined bending point prevents the possibility of electrically conductive elements for instance touching each other during adjustment of the mirror adjustment mechanism.

By designing the plug connection as a click and/or rotation and/or translation connection, mounting the electric accessory to the mirror adjustment mechanism may be further simplified, so that assembly can be carried out relatively inexpensively. Possibly, the plug connection may be so designed that only one click movement or one rotation movement or one translation movement suffices to couple the electric accessory of the mirror support electrically with the prong-shaped conductive elements.

For instance, the plug connection may be designed as a male plug part, for instance on the conductive elements, which can cooperate with a female plug part, for instance on the mirror support. For instance, the male plug part may be formed as a pin-shaped end of each conductive element and the female plug part may be formed as a receiving opening for receiving the male plug part.

By further providing the conductive elements with a plug connection with which an electrical connection with a power supply can be made, assembly may be further simplified. Possibly, the power supply may be situated in the mirror adjustment mechanism, for instance in the form of a battery or an accumulator. Possibly, the power supply may be provided by an onboard network of the motor vehicle, in which case, for instance, the onboard network may be coupled directly via the conductive elements to the electric accessory, or the conductive elements may be coupled via an intermediate connecting piece with the onboard network. It is also possible that the power supply for the electric accessory of the mirror adjustment mechanism is provided by the onboard network for instance in combination with a rechargeable battery or accumulator in the mirror adjustment mechanism.

Further advantageous embodiments are represented in the subclaims.

BRIEF DESCRIPTION OF THE DRAWINGS

The invention will be further elucidated in an exemplary embodiment which is represented in a drawing. In the drawing.

DETAILED DESCRIPTION

Figure 1:
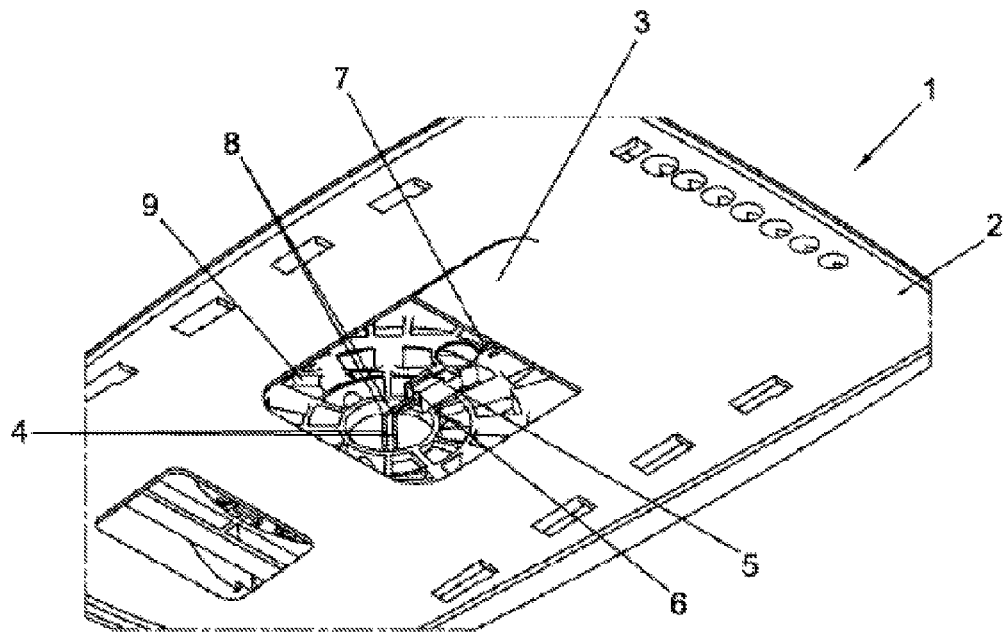
FIG. 1 shows a schematic perspective view of a mirror adjustment unit according to the invention.

In the drawing, corresponding components are represented with corresponding reference numerals. The drawing is given by way of non-limiting exemplary embodiment.

FIG. 1 shows a mirror adjustment unit 1 for a rearview mirror of a motor vehicle, comprising a mirror support 2 and a mirror adjustment mechanism 9. The mirror support 2 may be provided with an electric accessory 3, which is here schematically represented with a plate-shaped element 3. During assembly, the electric accessory 3 is preferably electrically connected with a power supply 10. Also other signals than electric signals, for instance digital signals for information display, can optionally be passed on to the electric accessory via the prong-shaped elements and the plug connection, and vice versa.

The power supply may for instance be arranged in the mirror adjustment mechanism 9 proper. For instance, the power supply may be a battery. Also, the power supply may be provided by an onboard network 11 of the motor vehicle.

The electrical connection of the electric accessory 3 with the power supply may be formed by a number of prong-shaped electrically conductive elements 4. The prong-shaped conductive elements 4 may at an end thereof be provided with a plug connection 5, with which an electrical connection with the electric accessory 3 can be formed.

In this exemplary embodiment, the plug connection 5 comprises a plug element 6 at the ends of the conductive elements 4, into which projecting elements 7 of the electric accessory 3 can be received.

By mounting the electric accessory 3, optionally with the mirror support 2, through a translation movement, during the translation movement the projecting elements 7 can be received in the plug element 6 and an electrical connection can be effected. For instance, the translation movement of the mirror support 2 and/or electric accessory 3 can be performed in a direction along the mirror support 2.

Figure 2:
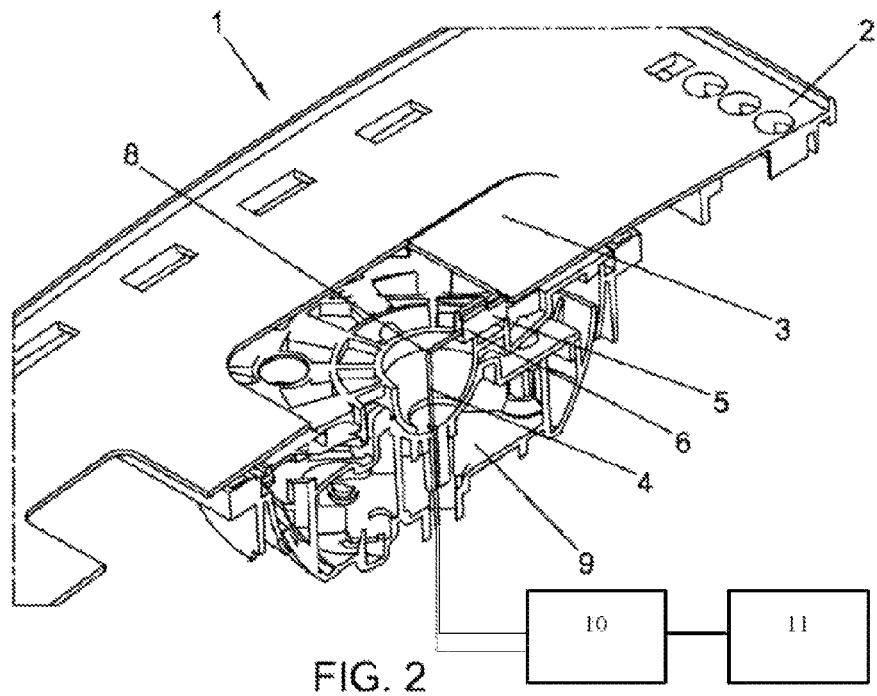
FIG. 2 shows a schematic perspective view of a cross section of the mirror adjustment unit of FIG. 1.

In FIG. 2 it can be seen that the prong-shaped conductive elements 4 are configured separately from each other and are each provided with a predetermined bending point 8. At the predetermined bending point 8, the prong-shaped conductive element 4 changes direction. Because of this predetermined bending point 8, the prong-shaped conductive elements 4 can relatively simply move along with the adjusting movements of the mirror adjustment mechanism 1. Possibly, the conductive elements 4 are of uninsulated design, so that manufacturing costs can be relatively low. For instance, the prong-shaped electrically conductive elements 4 may be manufactured from copper wire or steel wire. By making the electrically conductive elements 4 of prong-shaped design, they can have sufficient flexibility to follow the adjusting movements of the mirror adjustment mechanism.

In FIGS. 1 and 2, it is furthermore to be seen that the conductive elements 4 are passed approximately through the center of rotation of the mirror adjustment mechanism 9. Near the center of rotation the adjusting movements of the mirror adjustment mechanism 9 are relatively limited, and the conductive elements 4 can follow the adjusting movements relatively simply. The loads on the prong-shaped conductive elements 4 can thus remain relatively limited, so that the life of the prong-shaped conductive elements 4 can be sufficiently long.

Possibly, the conductive elements 4 may at the other end thereof be provided with a second plug connection (not shown) to form a connection with, for instance, an onboard network of a motor vehicle. Optionally, this plug connection may likewise be designed as a click, rotation, translation, snap, or pin/hole connection. Also, instead of a plug connection, the ends of the conductive elements may be fused-on, for instance by ultrasonic welding, to form the electrical connection with for instance the onboard network of a motor vehicle.

The invention is not limited to the exemplary embodiments represented here. Many variants are possible and will be clear to the skilled person within the scope of the following claims.

The invention claimed is:

1. A mirror adjustment unit for a rearview mirror of a motor vehicle, comprising:
   a mirror adjustment mechanism;
   a mirror support configured to be coupled to the mirror adjustment mechanism, the mirror support including at least one electric accessory; and
   a projecting element, said projecting element provided generally parallel to a plane of the mirror support and parallel to a longitudinal axis of a plug connection,
   wherein the mirror adjustment mechanism includes a plurality of prong-shaped electrically conductive elements configured to electrically connect, by the plug connection, the electric accessory of the mirror support with at least one of the conductive elements of the mirror adjustment mechanism.

2. The mirror adjustment unit of claim 1, wherein at least one of the prong-shaped electrically conductive elements is substantially uninsulated.

3. The mirror adjustment unit of claim 1, wherein the prong-shaped electrically conductive elements are electrically separate from each other.

4. The mirror adjustment unit of claim 1, wherein the prong-shaped electrically conductive elements comprise a predetermined bending point.

5. The mirror adjustment unit of claim 1, wherein the plug connection comprises a click connection, a rotation connection, a translation connection, or combinations of one or more of the foregoing connections.

6. The mirror adjustment unit of claim 1, wherein the prong-shaped electrically conductive elements include a plug connection configured to form an electrical connection with a power supply.

7. The mirror adjustment unit of claim 1, wherein the mirror adjustment mechanism comprises the power supply.

8. The mirror adjustment unit of claim 6, wherein the power supply is provided by an onboard network of the motor vehicle.

9. A mirror adjustment mechanism comprising:
   a plurality of prong-shaped electrically conductive elements,
   wherein the prong-shaped electrically conductive elements include a free-standing plug element, and the free-standing plug element is configured to electrically connect, by plug connection, the electrically conductive elements with a mirror support with at least one electric accessory.

10. A method for electrically connecting a mirror adjustment mechanism comprising:
    providing a number of prong-shaped electrically conductive elements and a mirror support comprising at least one electric accessory, the prong-shaped electrically conductive element configured for plug connection; and
    connecting the prong-shaped electrically conductive elements with the electric accessory by sliding the mirror support relative to the prong-shaped electrically conductive elements.

11. The mirror adjustment unit of claim 1, including a first relative position of the mirror support and the mirror adjustment mechanism in which the electric accessory is not connected to at least one of the conductive elements, and a second relative position of the mirror support and the mirror adjustment mechanism in which the electrical accessory is connected to at least one of the conducive elements.

12. The mirror adjustment unit of claim 11, wherein at least one of the mirror support and the mirror adjustment mechanism is configured to slide between a first position corresponding to the first relative position and a second position corresponding to the second relative position.

13. The mirror adjustment unit of claim 1, wherein the projecting element extends from the mirror support.

14. The mirror adjustment unit of claim 1, wherein the projecting element extends from the electric accessory.

15. The mirror adjustment unit of claim 14, wherein the projecting element extends into the plug connection.

16. The mirror adjustment unit of claim 1, wherein the prong-shaped electrically conductive elements are configured to communicate digital signals to the electric accessory for information display.

17. The mirror adjustment unit of claim 9, wherein the prong-shaped electrically conductive elements are substantially uninsulated.

18. The mirror adjustment unit of claim 9, wherein the projecting element includes at least two projecting elements extending from the electric accessory, the projecting elements extending generally parallel to a longitudinal axis of the plug connection.

19. A mirror adjustment unit for a rearview mirror of a motor vehicle, comprising:
    a mirror adjustment mechanism; and
    a mirror support configured to be coupled to the mirror adjustment mechanism, the mirror support including at least one electric accessory,
    wherein the mirror adjustment mechanism includes a plurality of prong-shaped electrically conductive elements configured to electrically connect, by plug connection, the electric accessory of the mirror support with at least one of the conductive elements of the mirror adjustment mechanism;
    wherein the prong-shaped electrically conductive elements comprise a predetermined bending point and the prong-shaped electrically conductive elements are uninsulated at the predetermined bending point.

20. The mirror adjustment unit of claim 19, including a projecting element extending from the electric accessory, the projecting element extending into the plug connection generally parallel to a plane of the mirror support and a longitudinal axis of the plug connection.

* * * * *

UNITED STATES PATENT AND TRADEMARK OFFICE
CERTIFICATE OF CORRECTION

PATENT NO.        : 8,672,495 B2                              Page 1 of 1
APPLICATION NO.   : 13/126783
DATED             : March 18, 2014
INVENTOR(S)       : Paulus Gerardus Maria van Stiphout It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 112 days.

Signed and Sealed this
Twenty-ninth Day of September, 2015

Michelle K. Lee
*Director of the United States Patent and Trademark Office*